TAPE DRIVE AND RECORDING APPARATUS

Original Filed July 29, 1950 6 Sheets-Sheet 1

INVENTORS.
HERBERT FRAZER WELSH
LEON ROBERT MOCK
EDMUND D. SCHREINER
JOHN PRESPER ECKERT, JR.
BY
Fred Fisher
ATTORNEY

TAPE DRIVE AND RECORDING APPARATUS

Original Filed July 29, 1950 6 Sheets-Sheet 2

INVENTORS.
HERBERT FRAZER WELSH
LEON ROBERT MOCK
EDMUND D. SCHREINER
BY JOHN PRESPER ECKERT JR.

Fred Fisher
ATTORNEY

TAPE DRIVE AND RECORDING APPARATUS

Original Filed July 29, 1950 6 Sheets-Sheet 3

INVENTORS.
HERBERT FRAZER WELSH
LEON ROBERT MOCK
EDMUND D. SCHREINER
JOHN PRESPER ECKERT JR.
BY
Fred Fisher
ATTORNEY

TAPE DRIVE AND RECORDING APPARATUS

Original Filed July 29, 1950

6 Sheets-Sheet 4

INVENTORS
HERBERT FRAZER WELSH
LEON ROBERT MOCK
EDMUND D. SCHREINER
JOHN PRESPER ECKERT JR.

BY [signature]

ATTORNEY

INVENTORS
HERBERT FRAZER WELSH
LEON ROBERT MOCK
EDMUND D. SCHREINER
BY JOHN PRESPER ECKERT JR.
Fred Fiske
ATTORNEY Aug. 25, 1959 H. F. WELSH ET AL 2,901,734

TAPE DRIVE AND RECORDING APPARATUS

Original Filed July 29, 1950

6 Sheets-Sheet 6

INVENTORS.
HERBERT FRAZER WELSH
LEON ROBERT MOCK
EDMUND D. SCHREINER
JOHN PRESPER ECKERT JR.

BY Fred Fisher
ATTORNEY

United States Patent Office 2,901,734

Patented Aug. 25, 1959

2,901,734

TAPE DRIVE AND RECORDING APPARATUS

Herbert Frazer Welsh, Philadelphia, Pa., Edmund D. Schreiner, Port Washington, and Leon Robert Mock, Forest Hills, N.Y., and John Presper Eckert, Jr., Philadelphia, Pa., assignors to Sperry Rand Corporation, a corporation of Delaware Original application July 29, 1950, Serial No. 176,722, now Patent No. 2,708,554, dated May 17, 1955. Divided and this application April 6, 1955, Serial No. 499,567

5 Claims. (Cl. 340—174)

Figure 1:
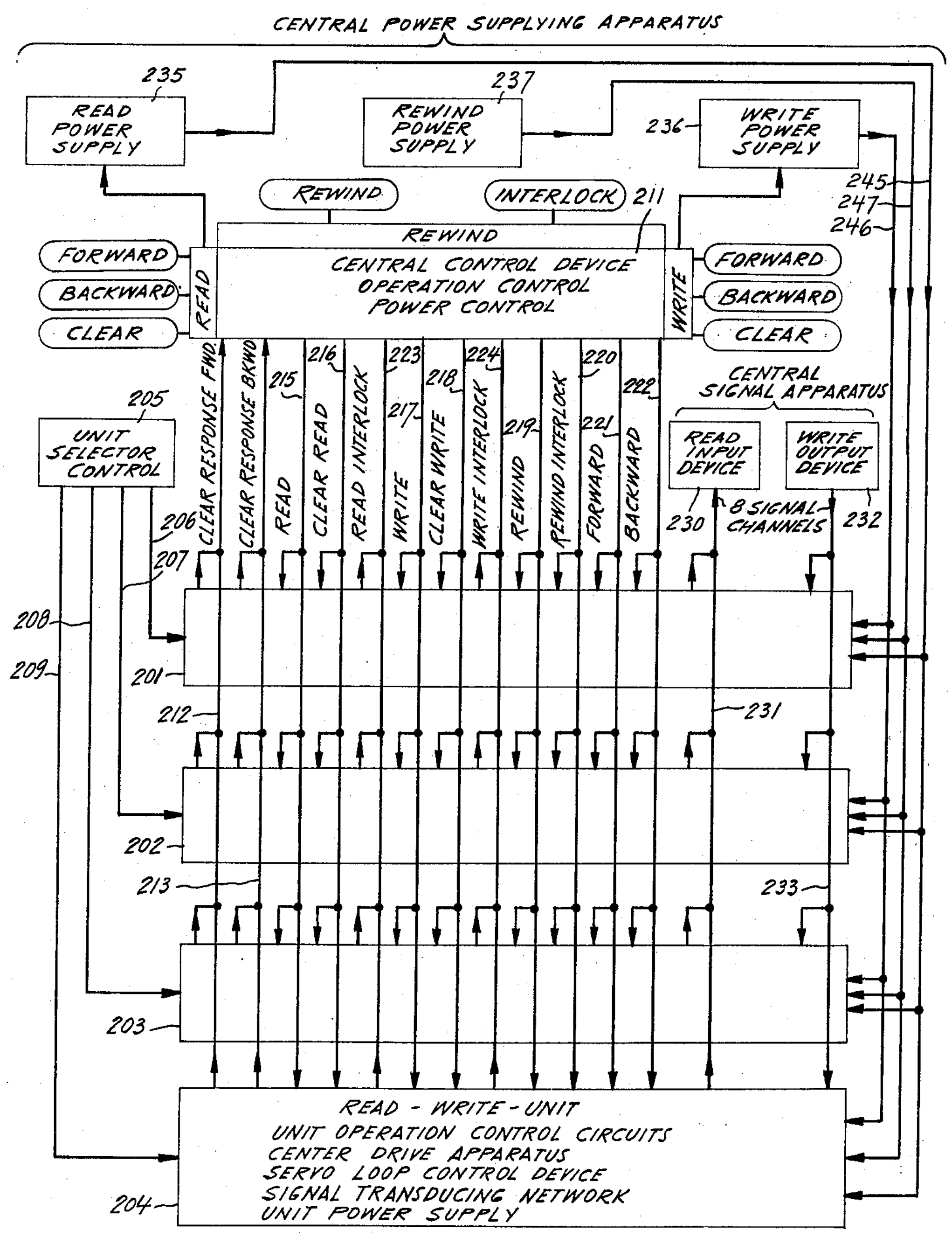

This invention relates to driving systems for flexible elongated members, and more particularly to a method of and apparatus for rapidly starting and stopping reading from and recording upon such members.

This application is a division of the copending application S.N. 176,722; filed on July 29, 1950, in the names of Herbert Frazer Welsh, Leon Robert Mock, Edmund D. Schreiner and John Presper Eckert, Jr.; entitled "Tape Drive and Recording Apparatus"; and issued as Patent 2,708,554 on May 17, 1955.

Realization of the potentialities of large scale, high speed digital computers requires economical and readily available storage systems for large quantities of digital information. The recordation of information upon a magnetically susceptible tape provides an efficient means of storing information. To maintain computer efficiency it is necessary that a tape driving apparatus be capable of receiving information in blocks, as it issues from the computer at a high rate of speed, starting and stopping between blocks. It is, therefore, essential that the tape be quickly accelerated to a desired recording speed from its inoperative state when information is available for recordation, and be decelerated equally rapidly at the end of the block. This is likewise necessary when the information is being delivered from a tape to a computer (reading).

In general, greater efficiency of operation can be effectuated by use of a highly versatile tape driving and recording apparatus for tape actuation in the forward, or backward directions while either recording or reproducing information, and also providing convenient and rapid tape rewind. The employment of a plurality of such tape driving and recording units capable of operating simultaneously to the extent of permitting the recordation of information by one unit while another is delivering recorded information and any number of other units are rewinding, not only provides a limitless information storage capacity, but enlarges the accessibility of recorded information while still further increasing information input-output capacity of the apparatus.

It is noted that the invention is not limited to the driving of magnetically susceptible tapes but includes all elongated flexible members. Neither is it intended that the scope of the invention be limited by its adaption for use in computing apparatus.

It is an object of this invention to provide new and improved means for connecting recording heads for reading or writing.

Still another object of the invention is to provide a new and improved signal input-output link selectively receiving signals from one source or delivering signals to another source effectively minimizing cross-talk and other spurious interference.

Yet a further object of the invention is to provide new and improved apparatus capable of either recording or reproducing magnetically a plurality of simultaneous signals, either operation being easily, rapidly, and reliably carried out.

From a mechanical standpoint, the tape handling system includes take-up and supply reels, coupled to a high speed tape drive through slack loops. The high speed tape drive is capable of very rapid acceleration and deceleration, as it handles a relatively short length of very thin tape with very little mass. The high acceleration and deceleration rates cannot be matched by the more massive supply and take-up reels, so the slack loops are interposed to serve as tape reservoirs during the time required for the supply and take-up apparatus to come up to an equilibrium speed. The size of the slack loops is controlled by a loop sensing device acting through a servo network controlling the associated supply or take-up motor to maintain the slack loop within predetermined size limits. Provision is made for adjusting the size of the slack loops in anticipation of the expected sense of operation of the high speed tape drive, the loop associated with the supply reel being enlarged and the take-up loop diminished in size when the tape is to be driven in a forward direction, and conversely when the tape is to be driven in reverse, as during a rewind operation. Random migration of the tape between supply and take-up loops when the high speed tape drive is deenergized is avoided by the application of loop tension through an equalizer bar to prevent tension differentials on the two loops.

The high speed starting and stopping characteristics of the tape drive particularly adapt the device for recording and delivering information in short bursts with little waste of time. Realization of these advantages requires complementary design of the electrical control circuits to incorporate high speed relays and apply auxiliary starting power surges and motor plugging power. High speed starts are further facilitated by operating the tape drive motor at less than synchronous speed under the control of a speed governing servo system. Delay is automatically provided when required for adjustment of the size of the slack loops.

Additional features of the invention permit a number of such devices to be connected to common control and information buses, with selection performed over a single group of individual conductors. Interlocking networks and component relationships prevent initiation of an operation in a given unit while it remains in the process of executing a previously started operation, or, optionally after rewinding, until manual correction of the interlock bar to further service. Availability for the next operation is signified by repeating back an interrogatory signal through clear indicating circuits. Safety shutdown is provided in the event of tape breakage or abnormal operation of most parts of the system.

Figure 2:
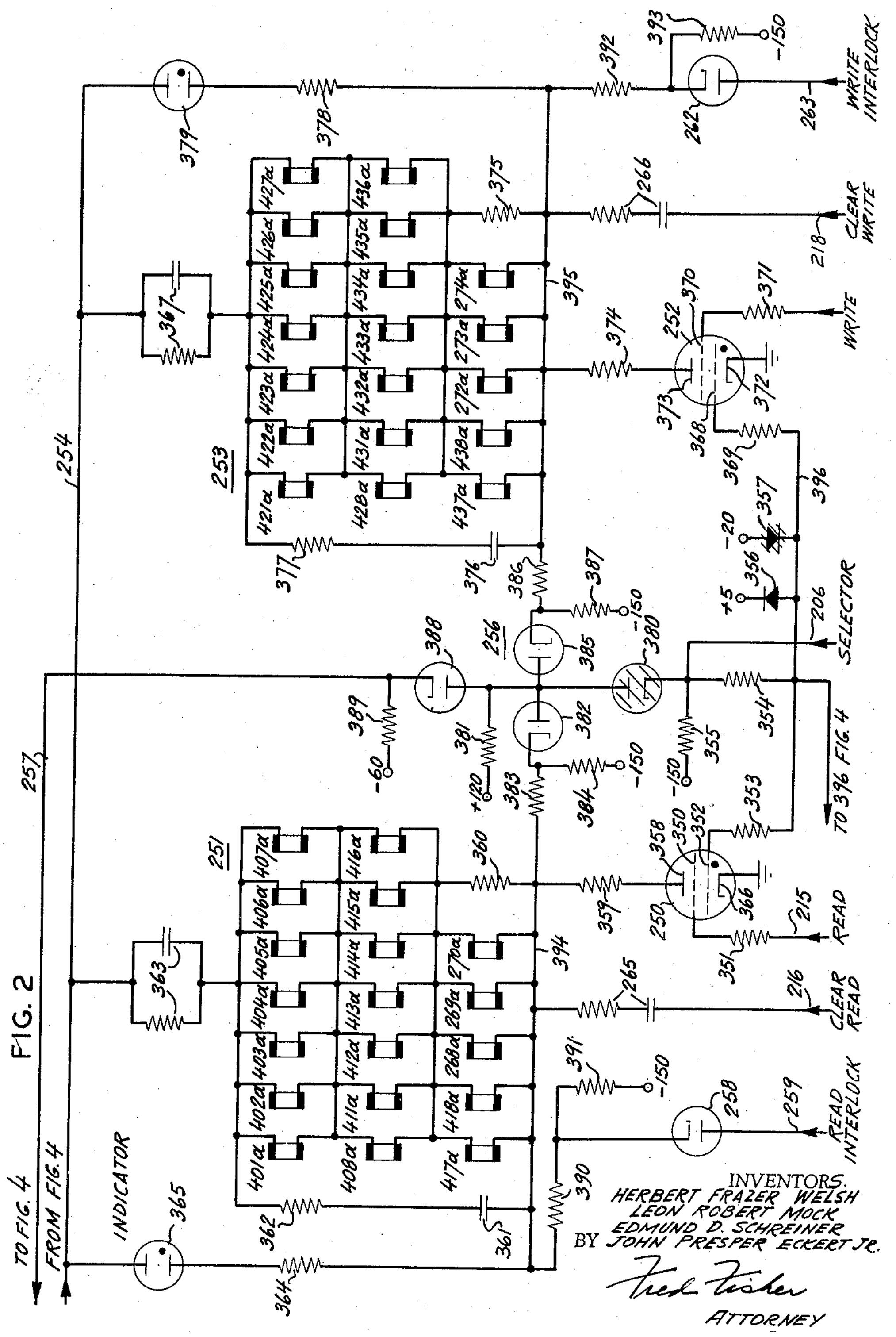
Figure 3:
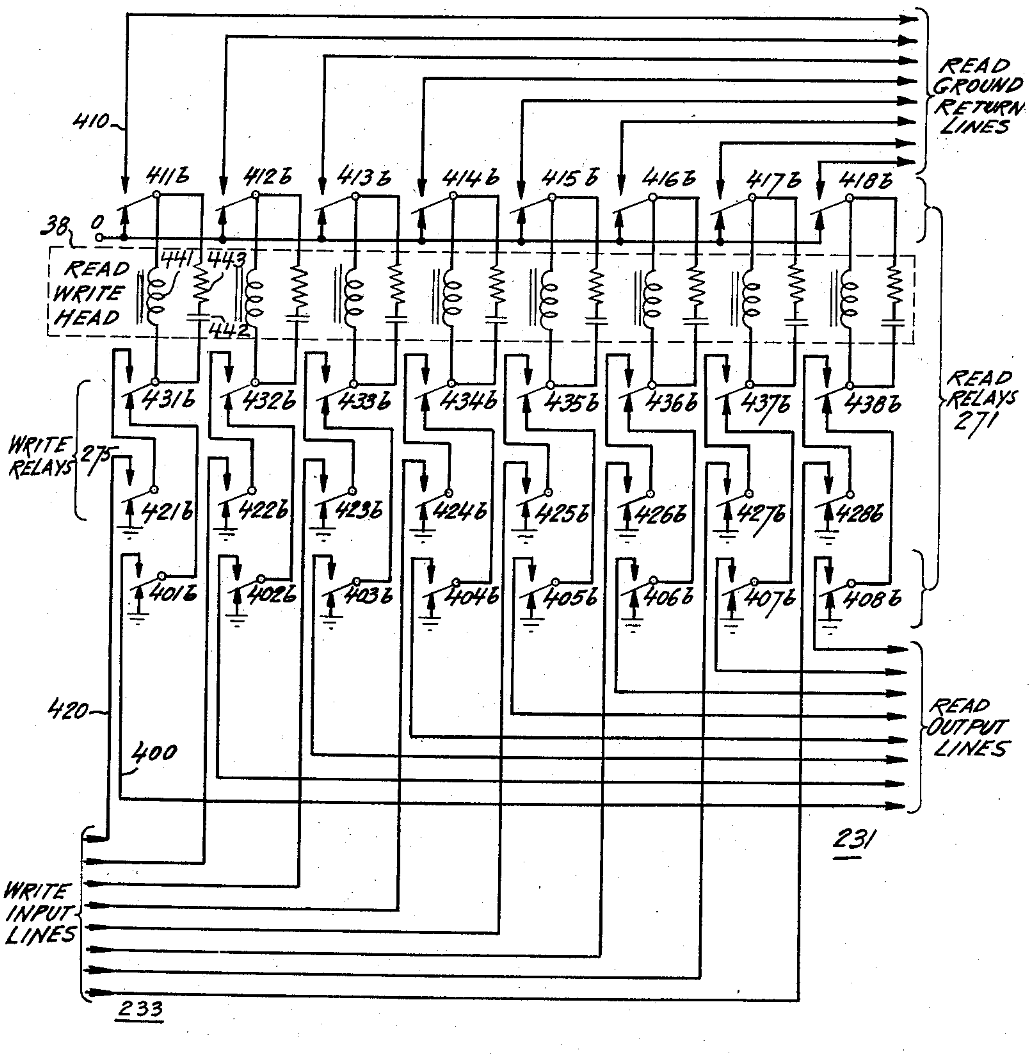
Figure 4:
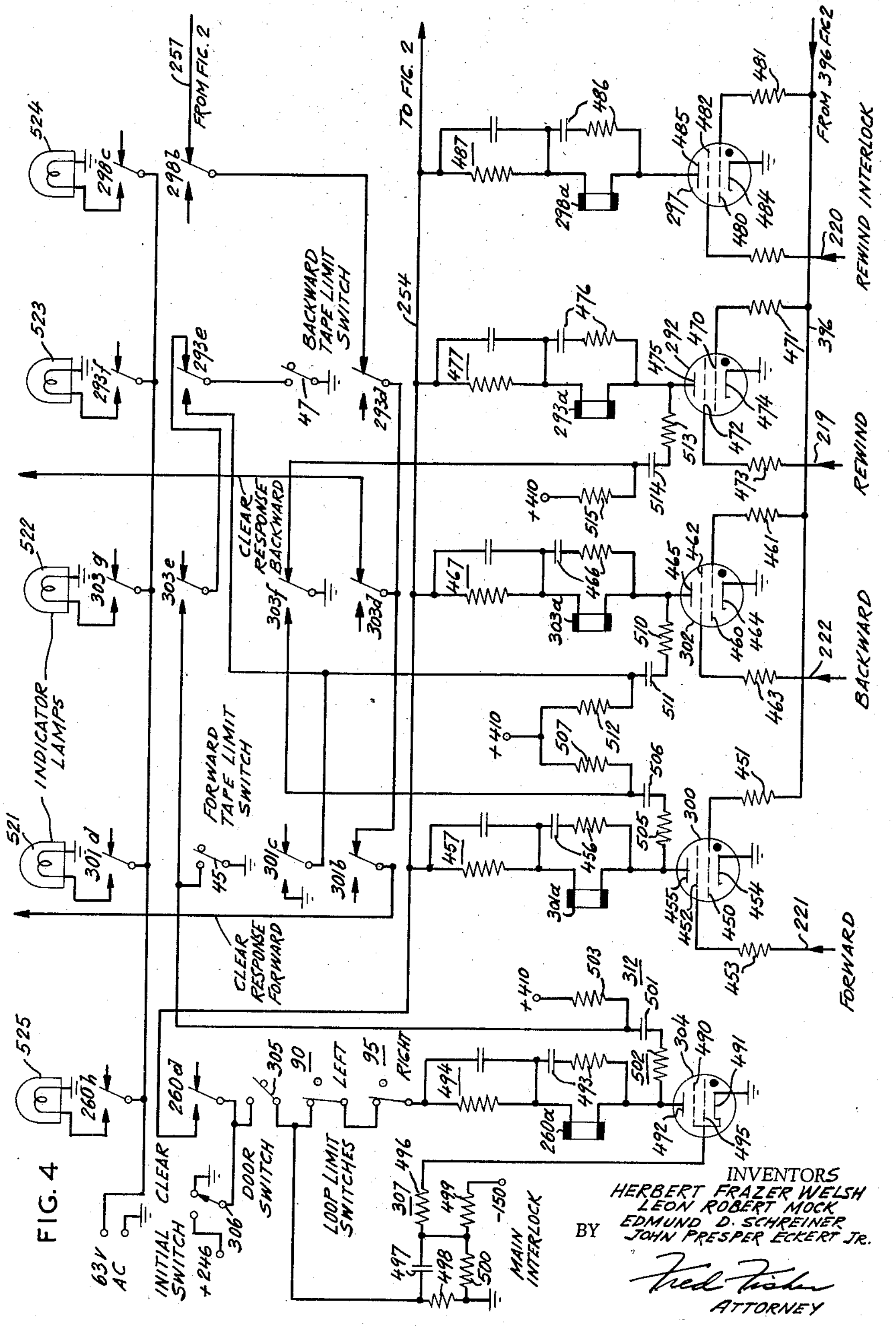
Figure 5:
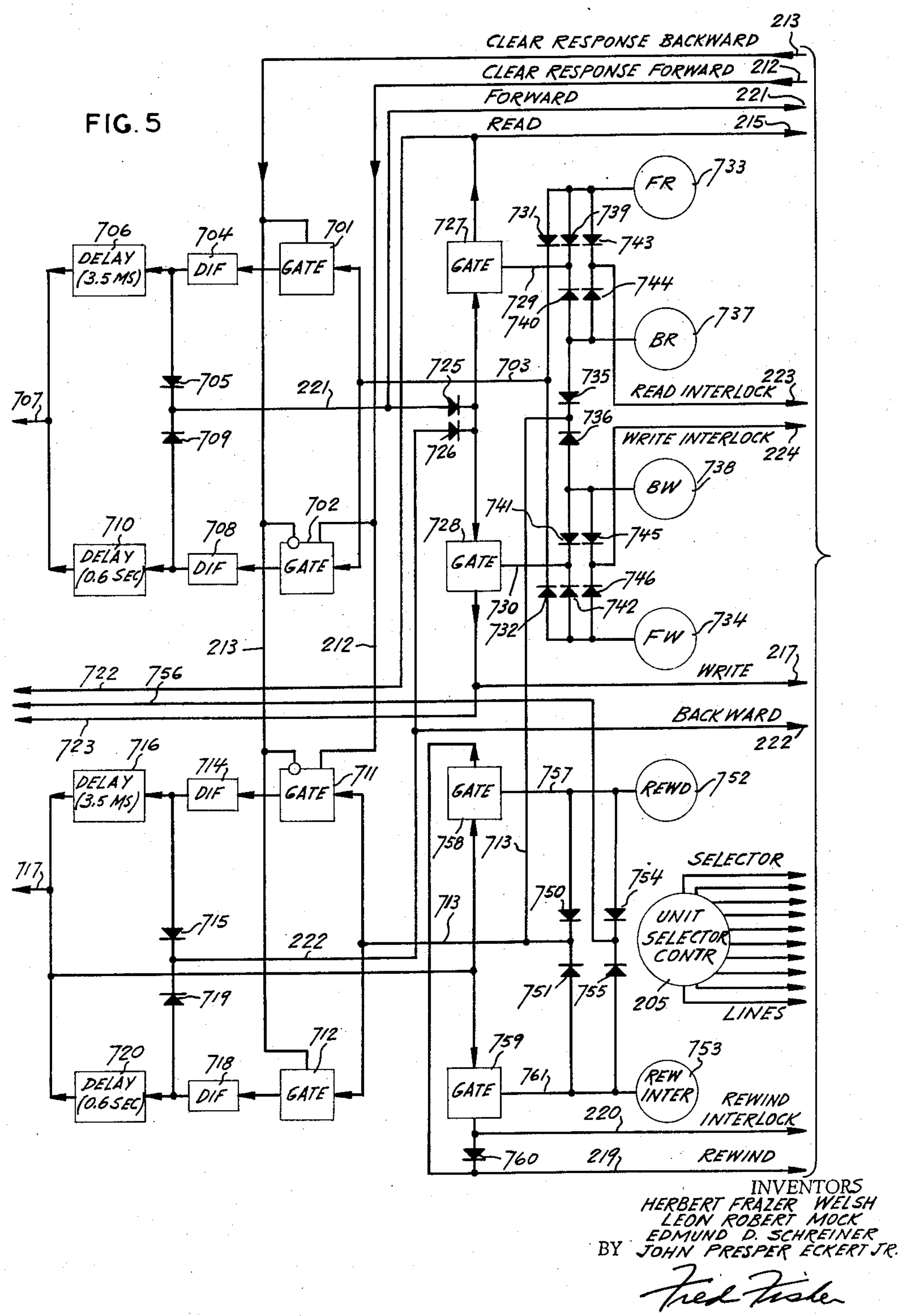
Figure 6:
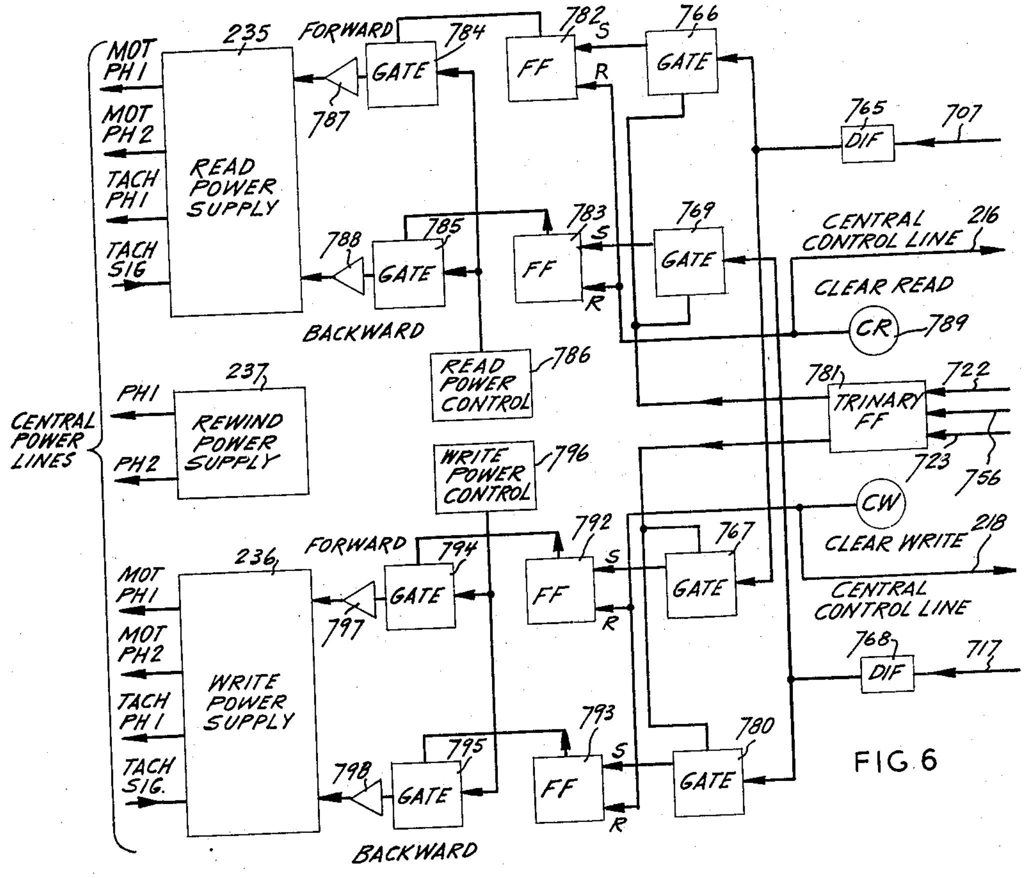
Figure 7:
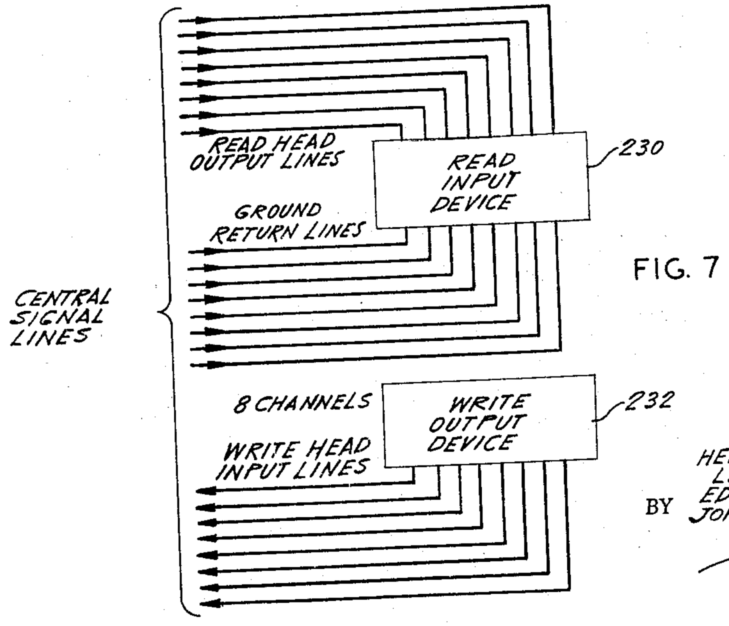

The above and further objects and aspects of the invention will become more apparent from the following detailed description taken in reference to the accompanying drawings in which:

Figure 1 illustrates diagrammatically in block form a group of tape handling units, associated with auxiliary equipment completing reading and writing combination, coupled with central control apparatus, Figure 2 illustrates schematically the portion of the operation control circuits for such a unit controlling read and write operations, Figure 3 illustrates schematically the signal transducing network associated with the operation control circuits shown in Figure 2, Figure 4 illustrates schematically the main interlock circuit and the remaining portion of the operation control circuits not shown in Figure 2, Figure 5 illustrates diagrammatically in block form the operation control portion of the central control device, Figure 6 illustrates diagrammatically in block form the power control portion of the central control device connecting with the central power supplying apparatus, and Figure 7 illustrates diagrammatically in block form the central read input and write output devices.

In the annexed drawings, like parts are identified by like reference characters and values of potential are given for purposes of illustration only and not in order to limit the scope of the invention. Heaters, heater circuits and power supplies, generally, have been omitted to promote simplicity, it being understood that any well known systems or circuits may be used for this purpose.

Reference is now made to the block diagram of Figure 1, for the combination of several read-write units with central control apparatus. The read-write units 201, 202, 203, and 204 each contain local control circuits, a center drive, a servo loop control system, a signal transducing network, and a unit power supply.

A unit selector control 205 has a plurality of selector lines 206, 207, 208, and 209, each connecting respectively to a read-write unit 201, 202, 203, and 204. It is to be noted at this point, that any number of read-write units may be used and in the event additional units are incorporated the unit seelctor control 205 must be provided with additional leads respectively connecting to each of the additional read-write units.

A central control device 211 comprising an operation control section and a power control section has clear response lines 212 and 213 returned thereto from each of the said read-write units. A read-write unit will send a clear response signal to the central control device only when it is actuated by the unit selector control 205 over its respective selector line. The forward clear response signal is sent over the line 212 whereas the backward clear response signal is sent over line 213. The signal delivered depends upon the condition of the local control circuits of the particular read-write unit excited by the unit selector control 205. For example, if a read-write unit has its operation control circuit set up for backward tape actuation, a clear response forward will be sent to the central control device 211, whereas if said operation control circuits are set up for forward tape actuation, a clear response backward signal will be returned to the central control device 211. If the selected read-write unit is not in condition for operation, neither a clear response forward nor a clear response backward signal will be delivered to the central control device.

The operational control section of the central control device 211 may receive the following read instructions from central control 211: forward read, backward read, clear read. With respect to write control, the following instructions may be received: forward write, backward write, and clear write. With respect to a rewind instruction, the operation control of the central control device 211 may receive a rewind instruction and a rewind interlock instruction. To enable the central control device 211 to effect control of the read-write units with regard to the enumerated instructions delivered to the local control section each read-write unit is connected with the central control device 211 by a read line 215, a clear read line 216, a write line 217, a clear write line 218, a rewind line 219, a rewind interlock line 220, a forward line 221, a backward line 222, as well as with a read interlock line 223 and a write interlock line 224, all of which lines are designated central control lines.

To read and write upon the driven tape, a central signal apparatus comprising a read input device 230 and a write output device 232 are connected by means of central signal lines 231 and 233, respectively, to each of the read-write units. It is to be noted that each of the central control lines as well as the central signal lines connects with its corresponding terminal of each of the read-write units, so that the corresponding terminals of the read-write units are interconnected and respectively served by a common line, whereby if additional read-write units are to be added, their corresponding central control line terminals (which exclude the unit selector control terminals) can be linked to the corresponding terminals of the other read-write units.

When a read-write unit is to be controlled by the central control device 211, it must first receive a selector signal from the unit selector control 205. The unit selector control can energize only one read-write unit at a time. When a read-write unit is selected and energized by the unit selector control 205, it returns a clear response signal to the central control device indicating the manner in which the local control circuits are set up, and whether the selected read-write unit is in condition to perform an operation. If, for example, read-write unit 201 is selected and returns a clear response backward signal to the central control device 211 and a forward read instruction is given, the read line 215 and the forward line 221 will be energized by the central control device 211. Although the read forward signals will be received by each of the read-write units, it will affect the operation control circuits only of the read-write unit 201 which is energized by the unit selector control 205 at this particular time. Likewise, if a backward read, forward read, or backward write instruction were delivered to the central control device 211, corresponding central signal lines would be energized to set up the local control circuits in the required manner for the performance of the designated operation by the selector energized read-write unit 201. In like manner a rewind or rewind-interlock instruction may be delivered to the operation control section of the central control device 211 to cause the energization of corresponding central signal lines to affect the selected read-write unit.

When the local control circuit of a selected read-write unit receives a read, write, rewind, or rewind-interlock signal from the central control device 211, the clear signals upon the response lines 212 and 213 are terminated, and a clear response signal cannot be obtained from such a read-write unit unless a clear read or a clear write instruction and signal is effected after the read or write signal, respectively, was delivered to the particular read-write unit. In the case of a rewind signal, a response signal will not be effected upon selection until the completion of the rewind operation by the read-write unit. When an interlock rewind signal has been effected, the response signal from the particular read-write unit cannot be received until the initial clear switch of the unit operation control circuit is actuated. The general effect of this is that once a read, write, rewind, or rewind-interlock operation is initiated control may not be exerted by the central control device 211 on a read-write unit engaged in the performance of a previously designated operation. It is again emphasized that this result is achieved by the fact that the central control device 211 cannot exert control until it is conditioned by a clear response appearing on either response line 212, 213, or both. The clear read instruction as well as the clear write instruction are the only instructions which may be effected without regard to the presence of a response signal.

If a read forward operation is initiated in read-write unit 201, the signal transducing network therein delivers signals to the central signal line 231 for delivery to the read input device 230. It is apparent that if a read operation were initiated in read-write unit 202 simultaneously with initiation or during the read operation of read-write unit 201, both units would deliver signals to the line 231 which would interfere with each other preventing the proper signal input to the device 230. Therefore, it is essential to prevent the simultaneous occurrence of reading operations upon more than one read-write unit. This is achieved by the use of the read interlock line 223 which delivers an interlock signal to the central control device 213 when any one of the read-write units is performing a read operation. This interlock signal prevents the central control device from initiating another read operation in response to a read instruction until a previously initiated read operation is completed and a clear read instruction resulting in a clear read signal upon the line 216 is received by read-write units to clear the local control circuit previously performing a read operation. For the reasons just given the write output device 232 connecting by means of the central signal lines 233 to all of the read-write units is capable of performing one write operation at a time and, therefore, an interlock signal is also provided through means of write interlock line 224 which prevents the central control device 211 from initiating a new write operation until the completion of a previously initiated write operation and the delivery of a clear write signal clearing the unit operation control circuit previously set up. Only after such time is the write interlock signal incapacitating the central control device 211 removed.

However, if a read forward instruction is delivered to the read-write unit 201 during the period of its selection and such operation is initiated, a write operation may be performed simultaneously with the read operation of unit 201 by any other selected unit delivering a response signal to the central control device 211. In addition to the simultaneous read operation or write operation any number of rewind-interlock operations may be concurrently performed by any number of the other remaining units.

In summary, a read-write unit to have an operation initiated is selected by the unit selector control 205, said unit delivering a response by means of central control lines 212 and 213 to the central control device 211. No instruction except a clear read or a clear write instruction may be effected unless a response signal is received by the central control device 211. When a response is received from the selected read-write unit a read instruction or a write instruction may be effected only if a respective read interlock signal or write interlock signal is not received by the central control device 211, indicating that a previous read or write operation has not been followed by a read clear or write clear respectively clearing the unit operation control circuit of the particular read-write unit previously set up for such an operation. The rewind or rewind interlock operation may be initiated upon any read-write unit responding to a selector signal regardless of the operations being performed by any of the other associated read-write units. Upon completing a rewind operation a read-write unit is automatically cleared placing it in condition for the initiation of a new operation. A rewind interlock operation differs from a rewind in that upon such an instruction the local control circuits of the affected read-write units must be manually cleared before a new operation can be initiated on this unit.

The power control section of the central control device 211 is activated by the operation control section, for controlling the delivery of power by a central power supplying apparatus connecting with each of the read-write units. The power supply to each read-write unit is for the purpose of actuating the center drive motor for causing forward drive, backward drive, and rewind drive. The power control functions of the central control device 211 can be appreciated, if, it is remembered that a read-write unit must assume a balance point position corresponding to the direction of tape drive, before center driving is initiated, which corresponds to one position for a forward operation and another balance point position for a backward, rewind, and rewind-interlock operation. Therefore, if a read-write unit has been performing a forward operation, the balance point must be shifted if a backward, rewind, or rewind-interlock operation is to be performed thereafter. Because this shifting process from one balance point to another involves a period of time, center drive power cannot be applied until sufficient time has elapsed to permit the completion of a balance point shifting. For example, if the read-write unit 201 had its operation control circuits set up to perform a forward operation and a backward operation is to be performed subsequently by this unit, the unit selector control 205 is first caused to energize this particular read-write unit. If the read-write unit 201 is in condition to perform a new operation, it will deliver a response to the central control device 211 as previously explained. The fact that the read-write unit 201 is set up for forward operation will be indicated by the fact that the response will be a clear response backward signal on the response line 213. The central control device 211 upon receiving this signal and an operation instruction, in this case a backward instruction such as backward read or backward write, the corresponding central signal lines will be energized to set up the unit operation control circuits of the selected read-write unit 201 to perform the indicated operation. The power control section of the central control device 211 will delay delivery of power by the central power supply apparatus to the center drive apparatus of the read-write unit 201 to allow time for a servo loop control device to shift the tape loops from the forward operation balance point to the backward operation balance point before center drive actuation. A similar delay would be occasioned if a rewind or rewind-interlock operation is to be initiated, for in that event the tape is also driven in the backward direction.

The central power supplying apparatus is comprised of a read power supply 235, a write power supply 236, and a rewind power supply 237, each connecting respectively through the center power lines 245, 246, and 247 with each of the read-write units. The read power supply 235 supplies power to the read-write unit executing a read operation, read operations as previously noted being carried out in a sequential manner by selected read-write units. The separate write power supply 236 which supplies power to the unit performing a write operation, allows the concurrent performance of read and write operation upon differing units although write operations like read operations are performed in a sequential manner by selected read-write units. If the read-write unit is set up to perform a read operation the central power line 245 is at that time connected with the unit center drive apparatus for its receipt of read power; and the read-write unit set up for a write operation connects the central power line 246, at such time, to its center drive apparatus for the receipt of write power. All of the other units not so set up although connected with the central power lines 245 and 246 do not have these lines operatively connected to the center drive apparatus until the read-write unit is properly set up for a corresponding operation.

The read power supply 235 is controlled by the power control section of the central control device 211 conditioning the delivery of power thereby to a read-write unit set up to execute any read operation. The power control section of the central control device 211 not only performs the function of delaying delivery of power to a unit until the proper balance point is assumed but also operates in coordination with the central signal apparatus to supply power when the read input device 230 is in condition to receive signals from the central signal lines 231. The write power supply 236 is controlled by the power control section of the central control device 211 independently of the control exerted by said section upon the read power supply 235, but being controlled in the same manner and for similar purposes, correspondingly acting in coordination with the write output device 232 of the central signal apparatus to supply tape drive power in coordination with the delivery of signals by the write output device 232 to the central signal lines 233, received by the signal transducing network of the read-write unit performing the write operation.

The rewind power supply 237 differs from the other considered power supplies in that it is not controlled by the central control device 211. The central power lines 247 connecting the rewind power supply 237 to each of the read-write units is constantly energized by the rewind power supply 237. Thus, each read-write unit set up for a rewind of rewind-interlock operation by means of the central control lines is conditioned to have its center drive apparatus receive rewind power to carry out these operations. For example, if the read-write unit 201 is in condition to initiate a new operation and a rewind or rewind-interlock signal is received from the central control lines to set up the unit operation control circuits, the rewind power line 247 is connected to the center drive apparatus to supply the required rewind power. Any number of read-write units may thus be set up to concurrently perform rewind or rewind-interlock operations.

As previously indicated, if a read-write unit set up for forward operation is to perform a rewind or a rewind-interlock operation, a sufficient time delay must be allowed for shifting to the proper operation balance point. In the case of a rewind or rewind-interlock operation this delay is effected in the following manner: Upon the receipt of a clear response backward signal by the operation control section of the central control device 211 impressed with a rewind or rewind-interlock instruction, the backward line 222 is first energized to set up the unit operation control circuits of the selected read-write units causing the balance point to shift from its forward operation position to its backward operation position. The operation control section of the central control device 211 delays the delivery of a rewind or a rewind-interlock signal to the selected read-write unit until sufficient time has elapsed to allow the shifting of the balance point, after which time such signal is delivered conditioning the unit for receipt of rewind power. At the completion of a rewind or rewind-interlock operation, rewind power is automatically disconnected terminating the operation.

Referring now to Figure 2, the portion controlling read and write operations is shown schematically in greater detail. The read thyratron 250 has its first control electrode 352 energized by the selector line 206 through the resistors 354 and 353, said electrode 352 being negatively biased by returning through the resistors 353, 354, and 355 to a negative potential of approximately 150 volts. The bus 396 joining the junction point of resistors 353 and 354 is maintained at a potential not exceeding plus five volts as an upper limit and minus twenty volts as a lower limit by means of a clamping diode 356 connecting to said bus 396 and having its cathode returned to a bus of approximately plus five volts and a normally conducting diode 357 having its anode joined to a bus of approximately minus twenty volts. The second control electrode 350 of the read thyratron 250 is connected to the read line 215 through a grid resistor 351 and the cathode 366 is directly returned to ground potential. The anode 358 of the read thyratron 250 returns to a positive voltage D.C. bus 254 through an anode resistor 359 joined to a read bus 394 connecting to a network of energizing coils of read relays 251 and associated components. A parallel connected group of elements joined to the read bus 394 comprises read energizing coils 417*a*, 418*a*, 268*a*, 269*a*, 270*a*, and a compensating element 360 all connecting in series with the group of read relay energizing coils 408*a*, 411*a*, 412*a*, 413*a*, 414*a*, 415*a*, 416*a*, further series connected with the parallel group of read relay energizing coils 401*a*, 402*a*, 403*a*, 404*a*, 405*a*, 406*a*, and 407*a*, all of which have connected across them an energy absorbing combination of capacitor 361 and resistor 362 and are series connected with a resistor-capacitor combination 363 connecting to the voltage supply bus 254.

The read thyratron 250 is normally nonconductive, a negative potential of minus 20 volts being normally maintained upon its first control grid 352. When the selector line 206 is energized, the potential upon the first control electrode 352 is raised to its upper potential limit of plus 5 volts. During this period when the first control electrode 352 is positive, the read thyratron 250 may be fired if a positive signal is delivered to the second control electrode 350 over the read line 215. The positive voltage delivered to the first control electrodes is clamped to prevent the firing of the thyratrons connected therewith without the concurrence of a positive signal on the second control electrode, which effect would result from local gas ionization due to grid current flowing through the first control electrode if unrestricted in its positive voltage excursion. Upon such concurrence of signals on the first control electrode 352 and the second control electrode 350, the read thyratron 250 becomes conductive causing the flow of current through the energizing coils of the read relays 251. Because of the inductance of the read energizing coils, the initial current surge therethrough is small, whereas the voltage drop is initially greater. At this time the energy absorbing branch comprising the capacitor 361 and resistor 362 being connected across the coils experiencing this voltage drop charges the capacitor 361 through the limiting resistor 362 and when the initial voltage drop across the energizing coils is reduced discharges to supply current therethrough. Likewise, if the current supply to the energizing coils is interrupted by open circuiting, the capacitor 361 absorbs the energy stored in the energizing coils of the read relays 251 preventing their damage.

The capacitor-resistor combination 363 is designed to supply a high initial current when the read thyratron 250 is fired so that the operation of the read relays 251 will be least delayed. This function is performed by the combination by means of its capacitor which discharges to supply current additional to that passing through the resistor when operation is initiated.

The series combination of a resistor 364 and neon indicator 365 are bridged from the read bus 394 to the voltage supplying bus 254. When the read thyratron 250 is not conducting the voltage drop between the buses 254 and 394 is insufficient to start current flow through the neon indicator 365. However, after the read thyratron 250 has been fired, the current flow through the thyratron 250 increases the voltage drop between the buses 254 and 394 sufficiently to cause the neon indicator 365 to become conductive visually indicating that the read thyratron 250 is also conducting and the read relays 251 are energized.

The read interlock diode 258 is also connected to the read bus 394 by means of a resistor 390 connecting with its cathode, which cathode is biased negatively by returning to a bus of approximately minus 150 volts through a resistor 391. The anode of the read interlock diode 258 is joined to the line 259 previously described. The line 259 is maintained at a potential that is no greater than the potential of the cathode in the read interlock diode 258. The possible maximum potential which may be maintained upon the line 259 decreases when the potential of the read bus 394 is lowered by the firing of the read thyratron 250.

Considering now the write thyratron 252, its associated elements and the write relays 253, which are similar to the components of the read circuits just described, the first control grid 368 of the thyratron 252 is returned to the selector bus 396 through the grid resistor 369. The second control electrode 370 is returned through the grid resistor 371 to the write line 217 and the cathode 372 is returned directly to ground potential. The anode 373 of the write thyratron 252 is returned to the positive voltage bus 254 through an anode resistor 374 connecting to a write bus 395 and a combination of the energizing coils of the write relays 253 and associated elements arranged in a manner similar to that of the read relays 251, comprising write energizing coils 421*a* to 428*a* inclusive, 431*a* to 438*a* inclusive, 272*a*, 273*a*, and 274*a*, all associated with a protective energy-absorbing branch comprising capacitor 376 and resistor 377, and through a resistor-capacitor combination 367. A neon indicator bulb 379 is also utilized in series with the resistor 378 connecting from the write bus 395 to the voltage supply bus 254 for indicating conduction by the write thyratron 252 and the activation of the write relays 253.

The write interlock diode 262 connects the line 263, previously described, to the write bus 395 through a resistor 392. The cathode of the write interlock diode 262 which connects with the resistor 392 is returned through a resistor 393 to a bus of approximately minus 150 volts. By this means the line 263 is not permitted to rise to a potential above the potential on the cathode of the write interlock diode 262, which potential is lowered when the write thyratron 252 is fired resulting in decrease in voltage on the write bus 395.

Once the read thyratron 250 or the write thyratron 252 is fired, it continues in a conductive state until the potential upon its anode 358, 373, respectively, which is positive with relation to its cathode 366, 372, has its voltage adequately decreased for a period sufficient in duration to stop current conduction and allow for deionization. The read thyratron 250 is extinguished by means of a negative signal derived from the clear read line 216 passing through the differentiator 265, comprised of a series capacitor-resistor, connecting with the read bus 394. Peak current in the deionizing circuit may be limited to about twice the normal thyratron current. With respect to the write thyratron 252, a similar result is effected to cause its extinguishment, by deriving a negative impulse from the clear write line 218 through the differentiator 266, comprising a capacitor and a resistor, connected to the write bus 395.

The response gate 256 comprising four valves, 380, 382, 385, and 388, has the cathode of normally conducting gate valve 380 connected to the selector line 206 at the junction point of resistors 354 and 355. The anode of valve 380 is returned to a positive bus of 120 volts through a resistor 381. The read gate valve 382 has its cathode connected to the read bus 394 by means of a resistor 383 and is biased negatively by returning through a resistor 384 to a negative potential of 150 volts, while its anode is returned by means of the resistor 381 to the positive 120 volt bus. A write gate valve 385 has its cathode connected with the write bus 395 by means of a resistor 386 and is biased negatively by returning through a resistor 387 to a potential of minus 150 volts, while its anode is also returned through the resistor 381 to the positive 120 volt bus. The buffer valve 388 has its anode likewise connected to the positive 120 volt bus through the said resistor 381 and its cathode biased negatively by connecting through a resistor 389 to a bus carrying a negative potential of approximately minus 60 volts and is joined to the response line 257.

The function of the response gate 256 is to deliver a positive-going signal to the response line 257 when the selector line 206 is energized, only if the read thyratron 250 and write thyratron 252 are both nonconducting. Thus, when a positive signal is delivered by the selector line 206 to the cathode of the normally conducting valve 380, the cathode assumes a more positive voltage than its anode causing the valve 380 to become nonconductive. If the read thyratron 250 is conducting, conduction will be transferred from the valve 380 to the valve 382 because of the lowered potential upon the cathode of the valve 382 connecting with the read bus 394. If, however, the write thyratron 252 is conducting, the lowered potential upon the write bus 395 will cause conduction to be transferred to the valve 385 when the valve 380 becomes non-conducting. If neither read thyratron 250 nor write thyratron 252 is conducting, the cathodes of the valves 282 and 385 will be at a higher potential than otherwise resulting in the transfer of conduction from the valve 380 to the buffer valve 388 upon the occurrence of a positive selector signal, thereby resulting in a positive-going signal appearing upon the selector line 257. The duration of this signal is concurrent with the application of the selector signal except that it may be earlier terminated by the firing of the read thyratron 250 or the write thyratron 252. At this point, if it is remembered that a response signal must be received by the central control device 211 before central control lines may be energized, it is apparent that once a read thyratron has been set up, or made conductive, a clear response signal will not be delivered to the central conrol divec 211 if the selector line to the same read-write unit is energized, preventing the setting up of any other operation thereon until such time when the conducting thyratron is cleared. Therefore, under normal operating conditions the read thyratron 250 and the write thyratron 252 cannot be conductive at the same time, and the conducting thyratron must be cleared to permit the response line 257 to be energized before the other thyratron may be fired.

Figure 3 illustrates schematically in greater detail the signal transducing network comprising read relays 271, write relays 275, and read-write head 38. The read relays 271 comprise relays 401 to 408 inclusive, and 411 to 418 inclusive, respectively, having contacting members 401*b* to 408*b* inclusive, and 411*b* to 418*b* inclusive, shown in Figure 3 and energizing coils 401*a* to 408*a* inclusive, and 411*a* to 418*a* inclusive, shown in Figure 2. Each relay contacting group, 401*b* to 408*b* inclusive, has its upper contacting member joined respectively to one of the read output lines 231, while each lower contacting member is returned to ground potential and contacts the armature associated therewith when the relay groups are de-energized. The read relay contacting groups, 411*b* to 418*b* inclusive, have the upper contacting member of each respectively joined to one of the read ground return lines, while the lower contacting member is returned to a reference potential of zero volts, and normally contacts its associated armature when in its de-energized position.

The write relays 275 are comprised of relay contacting groups 421*b* to 428*b* inclusive, and 431*b* to 438*b* inclusive, shown in Figure 3, having associated energizing coils 421*a* to 428*a* inclusive, and 431*a* to 438*a* inclusive, shown in Figure 2. Each upper contacting member of the relay contacting groups 421*b* to 428*b* inclusive is respectively connected with one of the write input lines 233, while each lower contacting member is returned to ground potential and contacts its associated armature when in its de-energized position. The upper member of the relay contacting group 431*b* is joined to the armature of the contacting group 421*b*, the lower contacting member being connected to the armature of the contacting group 401*b*. The armature of contacting group 431*b* is connected to the armature of the relay contacting group 411*b* through a coil 441 of the read-write head. A protective energy-absorbing branch, comprising a capacitor 442 and resistor 443, bridges the coil 441 of the read-write head. The members of the contacting groups 432*b* to 438*b* are connected to respective relays and coils of the read-write head in the same manner as the relay contacting group 431*b*. Thus, a write input line (233), a read output line (231), and a respective read ground return line are associated, respectively, with each coil of the read-write head and a set of two read relays and two write relays.

To illustrate the operation of the signal transducing network, the circuits associated with the coil 441 of the read-write head will be considered. The other circuits associated with the remaining seven coils of the read-write head are similar to the circuit to be described and provide an overall network containing eight signal channels. When neither the read relays 271 nor the write relays 275 are energized, the read output line 400, which connects to the upper contacting member of relay contacting group 401*b*, is open-circuited. This is because the armature of group 401*b* contacts the grounded contacting member. Likewise, the write input line 420 returns to the upper contacting member of the relay contacting group 421*b*, and is also open-circuited by virtue of the armature contacting the grounded member. Being likewise joined to the upper contacting member of the relay contacting group 411b, the read ground return line 410 is disconnected because the armature of said group returns to a reference potential of zero volts through the lower contacting member. Thus, the coil 441 of the read-write head is effectively short-circuited, one end being connected to ground potential through the armature and lower contacting member of the relay contacting group 411b, while the other end is connected to ground potential through the armature and lower contacting member of the relay contacting group 431b and the armature and grounded contacting member of the relay contacting group 401b.

Upon activation of the read relays 271, the coil 441 of the read-write head is connected to the read output line 400 through the activated relay contacting group 401b, which has its armature contacting the upper member, and through the deactivated relay contacting group 431b by means of the lowercontacting member and armature. The grounded end of the coil 441 is joined to the read ground return line 410 by means of the armature contacting the upper member of the activated relay contacting group 411b. It is to be noted that, when the read relays 271 are energized and the coil 441 is connected with the read line 400 and read ground line 410, cross-talk and interfering effects which might be caused by signals appearing upon the write input lines 420 are effectively minimized by having the upper contact of the relay contacting group 431b grounded through the inactivated armature of the relay contacting group 421b. Remembering that the equipment is designed to permit reading and writing operation to be carried out concurrently, it is not unusual for signals to be carried by the write input lines while signals are being delivered by a read-write head to the read output lines.

The guard circuit disclosed is important when high frequency signals are utilized because use of such signals increases the danger of undesirable crosscoupling and interference effects.

When the write relays 275 are energized, one end of the coil 441 is effectively connected with the write input line 420 through the armature of the energized relay contacting group 431b and through the armature of the energized relay contacting group 421b contacting the upper member. The other end of the coil 441 is returned to zero potential through the armature of the de-energized relay contacting group 411b. The lower contacting member of the relay contacting group 431b is also returned to ground potential through the armature of the de-energized relay contacting group 401b. This serves to isolate signals which may be upon the read output line 400. It is noted that the grounded end of the coil 441 is directly connected to a reference potential of zero volts by the relay contacting group 411b in its de-energized position during a write operation, whereas the grounded end of the coil 441 is returned by said relay contacting group to the read ground return line 410 when the read relays 271 are energized during a read operation. Because the read signals, being of lower intensity than the write signals, are more susceptible to interference resulting from cross-coupling, the set of read ground return lines is provided, which returns with the read output lines to the read input device 230 (Figure 7) in order to further reduce such interfering effects by minimizing possible linkage with interfering signals by providing a direct ground return path.

Although the read relays 271 and the write relays 275 associated with read-write head 38 do not normally operate in their energized positions simultaneously, if this does happen, the signal transducing network provides that the coils of the read-write head 38 receive signals from the write input lines. This allows a write operation to predominate over a read operation. If it is preferable that a read operation predominate over a write operation, this may be effected by simply interchanging certain relay connections of read and write lines.

All of the relays used in association with the write thyratron 250 and the read thyratron 252 are of the mercury-wetted electrode type which have been found to be highly reliable for use in connection with signals of small amplitude, since they afford good contact between the relay armature and contacting members. These relays have an operating time of three and one-half milliseconds for actuating the armature from one contacting position to the other when its coil is energized or de-energized. The significance of the three and one-half millisecond switching time will be further considered when the central control device 211 is described in detail.

The protective branches bridging the coils of the read-write head 38 act to minimize arcing in the event the relays are actuated while still carrying current.

Signal pulses are recorded by the head upon the tape as a means of storing intelligence. The method utilized is disclosed in U.S. patent application Serial No. 87,056, filed April 12, 1949, by applicants, John Presper Eckert, Jr., John C. Sims, Jr., and Herbert Frazer Welsh, entitled "Pulse Recording Apparatus." Briefly, the coils of the read-write head are operated with saturation currents, a saturation current being a current of such amplitude that a further increase in its amplitude does not significantly increase its magnetizing effect upon the recording tape. When a saturating current flows through a coil of the head in one direction a corresponding magnetically polarized signal is recorded, whereas when the saturating current flows in the opposite direction through the coil a magnetic signal of opposite polarity is recorded. To effect recording of pulse signals, a saturation current flowing in one direction is utilized in the absence of a recording signal, while the direction of current flow is reversed in order to record a pulse signal. Use of this method allows recording upon tape without the necessity of an erasing step to remove signals previously recorded. This is so because the saturation currents flowing in one direction or the other through the recording head are effective in removing previously recorded signals in the process of recording.

Reference is now made to Figure 4 for a more detailed schematic illustration of the portion of the local control circuits. These include some of the circuits associated with the forward thyratron 300, backward thyratron 302, rewind thyratron 292, rewind interlock thyratron 297 and main interlock thyratron 304. The forward thyratron 300 has its first control electrode 450 returned by means of a grid resistor 451 to the selector bus 396 extended from Figure 2. The second control electrode 452 of said thyratron 300 is joined to the forward line 221 by means of a grid resistor 453. The cathode 454 is directly returned to ground potential and the anode 455 is connected to the voltage supply bus 254 through the energizing coil 301a of the forward relay 301. Forward relay 301 has connected across it a protective branch 456 comprising a series resistor and capacitor which is connected in series with a parallel resistor-capacitor combination 457 having one end joined to the voltage supply bus 254.

The backward thyratron 302 has its first control electrode 460 returned to the selector bus 396 through a grid resistor 461 and the cathode 464 is directly returned to ground potential. The second control electrode 462 receives signals from the backward line 222 through a grid resistor 463. The anode 465 receives voltage by connecting to the voltage supply bus 254 through the energizing coil 303a of the backward relay 303. Backward relay 303 has a protective branch 466 connected in parallel with it, and is connected in series with the resistor-capacitor combination 467 which connects with the voltage supply bus 254.

The rewind thyratron 292 has a first control electrode 470 energized from the selector bus 396 through a grid resistor 471. Its cathode 474 is directly returned to ground potential, and its second control electrode 472 is linked to the rewind line 219 through a grid resistor 473. The rewind thyratron 292 has its anode 475 supplied with positive D.C. potential from the voltage-supplying line 254 through the energizing coil 293*a* of the rewind relay 293. The relay energizing coil 293*a* has a protective branch 476 connected in parallel with it and completes the circuit from the anode 475 through a parallel resistor-capacitor combination 477.

The rewind interlock thyratron 297 has its first control grid 480 also energized by connecting through a grid resistor 481 to the selector bus 396. Its second control electrode 482 is energized by the rewind interlock line 220 through a grid resistor 483, and its cathode 484 is directly returned to ground potential. The anode 485 of the rewind interlock thyratron 297 is returned to a positive D.C. potential by connecting to one end of the rewind interlock relay energizing coil 298*a*. This rewind interlock relay energizing coil 298*a* is connected in parallel with a protective branch 486 and its other end is returned to the voltage-supplying bus 254 through the parallel resistor-capacitor combination 487.

The forward thyratron 300 may be fired by a positive signal received by the second control electrode 452 from the forward line 221 during a period when the selector bus 396 delivers a positive signal to the first control electrode 450. The bus 396 rises to its upper limit of approximately 5 volts upon receipt of a positive signal over the selector line 206. The backward thyratron 302, the rewind thyratron 292, and the rewind interlock thyratron 297, are also respectively made conductive by the appearance of a positive impulse on their second control electrodes from the backward line 222, the rewind line 219 and the rewind interlock 220, respectively, during the period of positive selector bus excursion.

The main interlock thyratron 304 has its suppressor grid 490 joined to its cathode 491 and directly returned to ground potential. The energizing coil 260*a* of the main interlock relay 260 joins the anode 492 which is returned to a positive D.C. potential of 246 volts. A protective branch 493 is connected across main interlock relay 260 and a parallel resistor-capacitor combination 494 is series connected with its other end. This completes the circuit through the loop limit switches 95, 90, the door switch 305 in its closed position, and the initial clear switch 306. The arm of switch 306 contacts the left-hand member which is joined to the 246 volt source. The control electrode 495 of the main interlock thyratron 304 is connected through a series resistor 496 and a coupling capacitor 497 to the movable arm of the door switch 305, to receive impulses upon the actuation of the door switch 305 or the initial clear switch 306. The junction point between the door switch 305 and the coupling capacitor 497 is returned to ground potential through a voltage dropping resistor 498. The control electrode 495 is also biased to cut-off by virtue of its being returned to a negative potential through the resistor 496 which is joined to the junction of voltage-dividing resistors 499 and 500 respectively connecting to a negative potential of 150 volts and a reference ground potential.

If the initial clear switch 306 has its contacting arm actuated from its right-hand contacting position to its left-hand position, when the door switch 305 and the loop limit switches 90, 95 are in the closed position, the main interlock thyratron 304 is fired. Under such conditions, positive potential is applied to the anode 492 of the thyratron 304 and a positive-going impulse is delivered to the control electrode 495 through the differentiator 307. Likewise, conduction may be initiated by actuating the door switch 305 from its "off" to "on" position when the initial clear switch is in its left-hand "on" position. The above two methods are the exclusive means by which the main interlock thyratron 492 may be fired.

The main interlock thyratron 304 may be cleared by turning the initial clear switch 306 to its right-hand "off" position or by opening the door switch 305. In either case the removal of positive voltage from the anode 492 is effected and a negative-going impulse is delivered from the differentiator 307 to the control electrode 495. The main interlock thyratron 304 may also be extinguished by the opening of the left or right loop limit switches 90, 95. In this way, positive potential is removed from the anode 492. The thyratron 304 may further be extinguished by the delivery of a negative-going impulse to the anode 492 by the actuation of the forward tape limit switch 45 which has its left-hand terminal coupled to the anode 492 through the series connection of a coupling capacitor 501 and resistor 502. The left-hand terminal of forward switch 45 is also returned to a positive potential of 410 volts through a dropping resistor 503. When the arm of switch 45 is actuated to return the left-hand contacting member to ground potential a negative-going impulse is delivered to the anode 492. The backward tape limit switch 47 in a like manner extinguishes the main interlock thyratron 304 by delivering a negative-going impulse when its arm is actuated to contact the left-hand member. This act is conditional upon the backward thyratron 302 being conductive and the rewind thyratron 292 being non-conductive because the circuit is made through the rewind relay contacting group 293*e* in a de-energized position and through the backward relay contacting group 303*e* in the energized position.

The protective branches with each of the energized coils and the resistor-capacitor combination connected in series with each energizing coil have already been described in connection with read relays 251 and the write relays 253 shown in Figure 2.

The forward thyratron 300 has its anode 455 further connected, by means of a resistor 505 through a coupling capacitor 506, to the left-hand member of the backward relay contacting group 303*f*, said capacitor 506 being returned through a resistor 507 to a positive potential of 410 volts. The anode 465 of the backward thyratron 302 is also connected by means of a resistor 510 through a coupling capacitor 511 to the armature of the forward relay contacting group 301*c*, and with the left-hand contacting member of the rewind relay contacting group 293*e*. Capacitor 511 is also returned through a resistor 512 to a positive potential of 410 volts. The anode 475 of the rewind thyratron 292 is likewise coupled through a resistor 513 and a capacitor 514 to the right-hand contacting member of the backward relay contacting group 303*f*. Capacitor 514 is returned through a charging resistor 515 to a positive potential of 410 volts.

When the forward thyratron 300 is fired, the forward relay contacting group 301*c* is actuated delivering a negative impulse to the anode 465 of the backward thyratron 302 which is then cleared. When the backward thyratron 302 is fired, its conduction results in the actuation of backward relay contacting group 303*f*. One side of the capacitor 506 returns to ground which causes a negative-going impulse to be impressed upon the anode 455 of the forward thyratron 300, thereby extinguishing it. For the performance of either a rewind or rewind interlock operation the forward thyratron 300 is similarly extinguished and backward thyratron 302 is set up. When the rewind thyratron 292 conducts, the rewind relay contacting group 293*e* is actuated, and the capacitor 511 is returned to ground when the backward tape limit switch 47 is actuated. Such grounding of capacitor 511 produces a negative-going impulse upon anode 465 which extinguishes thyratron 302. When the backward thyratron 302 is extinguished and the backward relay contacting group 303*f* is de-energized, the coupling capacitor 514 is returned to ground. This results in the impression of a negative-going impulse upon the anode 475 which extinguishes the rewind thyratron 292. As previously explained, the rewind interlock thyratron 297 is extinguished by the main unit interlock removing voltage from the voltage-supplying bus 254.

Indicator lamps 521, 522, 523, 524, and 525 are respectively associated with the relay contacting groups 301*d*, 303*g*, 293*f*, 298*c*, and 260*h*, respectively, of the forward relay 301, the backward relay 303, the rewind relay 293, the rewind interlock relay 298, and the main unit interlock relay 260. The armature of each one of these relay contacting groups is joined to a bus 526, which is returned to a 6.3 volt A.C. source of power. The left-hand contacting member of said relay contacting groups is connected, respectively, to one lead of an indicator lamp which has a second lead returned to ground potential. This arrangement of the indicator lamps affords a means of visually indicating the operation of the associated thyratron and relay circuits. For instance, if the forward thyratron 300 is fired, the anode current through the energizing coil 301*a* of the forward relay 301 actuates the armatures of the forward relay contacting groups including contacting group 301*d* and results in the supply of power to illuminate indicator lamp 521. It should be noted that the indicator lamps may obtain power from their power source regardless of whether the main interlock thyratron 304 is extinguished or fired. Thus, in the case of power failure to the initial clear switch 306 or of thyratron 304 being cleared due to normal or abnormal conditions on the read-write unit, the indicator lamps show the state of the unit control circuits. Thus, the indicator lamp will also show whether a relay armature is stuck in its actuated position when the main interlock removes power from the unit control circuits.

Figure 5 diagrammatically illustrates in block form the operation control portion of the central control device considered previously, particularly with regard to Figure 1. A forward gate 701 and a forward loop delay gate 702 receive at their inputs instruction signals over a forward instruction line 703, and, when properly conditioned, the forward gate 701 passes such signals to the differentiator 704 which delivers a signal to the forward line 221 through a buffer diode 705 having its anode joined to the differentiator 704. At the same time, the differentiator 704 delivers an impulse to the forward delay 706, which excites the forward output line 707 after a delay of 3.5 milliseconds. The forward gate 701 is conditioned to pass signals on the forward instruction line 703 when a signal is present on the clear response backward line 213. When a signal is present on the clear response forward line 212, the forward delay gate 702 is conditioned for passing signals on the forward instruction line 703, in the absence of a signal on the clear response backward line 213 which inhibits the forward loop delay gate 702. Signals passed by the gate 702 pass through a differentiator 708 to excite the forward line 221 through the crystal buffer 709 having its anode joined to the differentiator 708. Differentiator 708 also passes stimuli to the forward loop delay 710 which delivers a signal to the forward output line 707 after a lapse of 0.6 second.

A backward gate 711 and the backward loop delay gate 712 receive input signals over a backward instruction line 713. The backward gate 711 is conditioned for passage of signals upon the backward instruction line 713 when a signal appears upon the clear response forward line 212 in the absence of a signal upon the clear response backward line 213. The presence of a signal on line 213 acts to inhibit the backward gate 711. Differentiator 714 receives signals passing through the backward gate 711 and passes a signal through a buffing diode 715 to the backward line 222 while exciting the backward delay 716 which delivers a signal to the backward output line 717 after a delay of 3.5 milliseconds. The backward loop delay gate 712 is conditioned for passage of signals upon the backward instruction line 713 by the presence of a clear response backward signal on the line 213. The signal passed by the backward loop delay gate 712 passes to a differentiator 718 to excite the backward line 222 through the buffer diode 719 which has its anode joined to the differentiator 718, while the backward loop delay 720 is energized to deliver a backward output signal to the line 717 after a delay of 0.6 second.

The signals delivered through the buffing diodes 705 and 709 to the forward line 221 are also delivered through a buffing diode 725 to the input of a read gate 727 and input of a write gate 728. The backward signals delivered through the buffing diodes 715 and 719 to the backward line 222 also excite the inputs of the gates 727 and 728 through a buffing diode 726 having its anode joined to the backward line 222. The read gate 727 passes either forward or backward signals appearing at its input to the read line 215 when it is conditioned by a signal upon the read instruction line 729. In a like manner, the write gate 728 passes signals appearing upon its input to excite the write line 217. These signals are derived from the forward line 221 or the backward line 222 when the write gate 728 is conditioned by a signal upon the write instruction line 730. Whenever the read line 215 is excited this signal also appears upon the read selector line 722 which is joined to the read line 215. A write selector line 723 also receives signals appearing upon the write line 217 by connecting thereto.

The forward instruction line 703, delivering signals to the input of the gates 701 and 702, joins the cathodes of a pair of diodes 731 and 732 which have their anodes respectively connecting to a forward read instruction signalling device 733 and a forward write instruction signalling device 734. The backward instruction line 713 which delivers instruction signals to the inputs of the backward gates 711 and 712 is joined to the cathodes of a pair of crystal diodes 735 and 736 which have their anodes respectively returned to a backward read instruction signalling device 737 and a backward write instruction signalling device 738. The read instruction line 729 conditioning the read gate 727 is joined to the cathodes of a pair of diodes 739 and 740 having their anodes respectively returned to the forward read device 733 and the backward read device 737. Correspondingly, the write instruction line 730 conditioning the write gate 728 is linked to the cathodes of a pair of crystal diodes 741 and 742 which have their anodes respectively returned to the backward write device 738 and the forward write device 734.

Upon the production of a forward read instruction by the device 733, a signal is passed through the diode 731 to the forward instruction line 703 whence it appears at the inputs of gates 701 and 702. If neither a clear response backward or clear response forward signal respectively is present upon the lines 213 and 212, the gates 701 and 702 are not conditioned to pass signals upon the forward instruction line 703. If a clear response backward signal is present upon line 213, gate 701 passes the signal on line 703 which appears upon the forward output line 707 after a delay of 3.5 milliseconds. The signal from gate 701 also pases through the read gate 727 to the read line 215 and the read selector line 722, a conditioning signal being present upon the read instruction line 729 passing through the diode 739 from the forward read device 733.

If a clear response forward signal appears upon line 212, the forward loop delay gate 702 passes the signal derived from the forward read device 733 to cause delivery of a signal upon the forward output line 707 after a delay of 0.6 second and delivers a signal through the read gate 727 as previously described. If response signals appear upon both lines 212 and 213, the gate 702 is inhibited so that signals upon the forward instruction line 703 may only pass through the forward gate 701.

When an instruction signal is delivered by the backward read device 737, the backward instruction line 713 is energized, and the read gate 727 is conditioned for signals appearing upon its input. If a signal does not appear upon the clear response backward line 213 or the clear response forward line 212, neither backward gate 711 nor gate 712 is conditioned for signal passage. If, however, the clear response forward line 212 is energized, backward gate 711 is conditioned for passage of signals on the backward instruction line 713 causing the appearance of a backward output signal on the backward output line 717 after a delay of 3.5 milliseconds, and passing a signal through the read gate 727. However, if the clear response backward line 213 is energized, the backward loop delay gate 712 will pass the signal after a delay of 0.6 second to the backward output line 717 and through the gate 727 to the read line 215 and the read selector line 722. The backward loop delay gate 712 will also be effective in passing signals when both of the response lines 212 and 213 are energized, the backward gate 711 being inhibited by the presence of a signal upon the response line 213.

Upon the delivery of a backward write instruction by the device 738 to the backward instruction line 713, the backward gates 711 and 712 are conditioned for passage of the signal in a manner just described causing delivery of a signal to the backward output line 717 after a delay of 3.5 milliseconds, or 0.6 second. However, in this case line 717 delivers a signal to the write line 217 and the write selector line 723 through the write gate 728 which is now conditioned for signal passage.

A forward write instruction signal from the device 734 energizes the inputs of the forward gates 701 and 702. This signal when passed by the forward gate 701 or 702, energizes the forward output line 707 after a delay of 3.5 milliseconds or 0.6 second, respectively, and delivers a signal to the write line 217 and the write selector line 723 through the write gate 728 which is conditioned for signal passage at this time.

The read interlock line 223 is joined to the cathode of a pair diodes 743, 744 which have their anodes respectively linked to the forward read device 733 and the backward read device 737.

If the read interlock line 223 receives an interlock signal, as when a read-write unit is performing a read operation, a read instruction may not be delivered by the forward read device 733 or backward read device 737 because signal outputs from these devices will not be allowed to rise more positively than the signal upon the read interlock line 223, making them ineffective. In a like manner, the write interlock diodes 745 and 746 prevent the delivery of an instruction signal by the backward write and forward write devices 738, 734 when the write interlock line 224 receives an interlock signal which occurs when a read-write unit is executing a write operation. Thus, the initiation of a concurrent write operation by another read-write unit is prevented.

The backward instruction line 713 delivering signals to the backward gates 711 and 712 is also joined to the cathodes of a pair of crystal diodes 750 and 751, which have their anodes respectively returned to a rewind instruction signalling device 752 and a rewind interlock instruction signalling device 753. The rewind device 752 and the rewind interlock device 753 are respectively joined to the anodes of the crystal diodes 754 and 755 which have their cathodes joined to rewind selector line 756.

Signals are delivered from the backward output line 717 to the input of a rewind gate 758 which gate is conditioned for passing signals to the rewind line 219 by stimuli delivered over a rewind instruction line 757 from the rewind device 752. A rewind interlock gate 759 has its input joined to the backward output line 717 to pass signals therefrom to the rewind interlock line 220, and to the rewind line 219 through a buffer diode 760 having its cathode joined to the rewind line 219. The rewind interlock gate 759 passes signals when conditioned by a signal derived from the rewind interlock instruction device 753 over a rewind interlock instruction line 761.

When the rewind instruction device 752 delivers an instruction signal to the backward instruction line 713, this signal will be passed by the backward gates 711 or 712 under the proper conditions already considered. Gate 711 or 712 delivers a signal to the backward line 222 and causes the appearance of a signal on the backward output line 717 delayed by 3.5 milliseconds or 0.6 second, which excites the rewind line 219 by passing through the rewind gate 758 which is conditioned during a period of rewind instruction. A signal is also delivered to the rewind selector line 756 upon the delivery of a rewind instruction by the device 752.

If the rewind interlock device 753 delivers an instruction signal, the backward line 222 is energized under the circumstances just considered for the delivery of a rewind signal by device 752, and the rewind selector line 756 is energized. However, in the instant case the rewind interlock gate 759 is conditioned to pass a signal derived from the backward output line 717 to the rewind interlock line 220 as well as by means of a buffing diode 760 to the rewind line 219. Thus, when the rewind interlock instruction is delivered by device 753, an operation signal is received by the rewind interlock line 220 in addition to the operation signals delivered to the backward line 222, rewind line 219, and rewind selector line 756 which result from a rewind instruction from the rewind device 752. It may here be noted that signals received over the rewind line 219 and rewind interlock line 220 being derived from the backward output line 717 are delayed by either 3.5 milliseconds or 0.6 second, whereas signals over the backward line 222, the write line 217, read line 215, forward line 221, are not subject to such delay.

Figure 6 illustrates diagrammatically the power control section of the central control device as connected with the central power-supplying apparatus. The forward output line 707 delivers signals through a differentiator 765 to the inputs of a read forward power gate 766 and a write forward power gate 767. The backward output line 717 through a differentiator 768, energizes the inputs to a read backward power gate 769 and a write backward power gate 780. The power gates 766, 769, 767, 780, are conditioned for passing signals on their inputs by a trinary selector flip-flop 781 which has three input terminals respectively connecting with the read selector line 722, the write selector line 723 and the rewind selector line 756. When the read selector line 722 is energized the trinary selector flip-flop 781 is placed in one of its stable stages in which read forward power gate 766 and the read backward power gate 769 are conditioned to pass signals appearing at their inputs from the forward output line 707 and the backward output line 717 respectively.

Signals passed by the read forward power gate 766 set up a read forward power flip-flop 782 which conditions a read forward power control gate 784 for passage of signals from a read power control 786 through an amplifier 787 to the forward power control terminal of the read power supply 235.

In a like manner, signals passed by the read backward power gate 769 set up a read backward power flip-flop 783 which conditions a read backward power control gate 785 for passage of signals from the read power control 786 through an amplifier 788 to the backward power control terminal of the read power supply 235.

The read power flip-flops 782 and 783 are reset by a clear read instruction signalling device 789, inhibiting the gates 784 and 785 from passing power control signals from the read power control 786. At the same time, the clear read device 789 delivers a signal to the clear read line 216.

When the trinary selector flip-flop 781 is pulsed into its write selecting state by a signal upon the write selector line 723, the write forward power gate 767 is conditioned for passage of signals arriving from the forward output line 707 and the write backward power gate 780 is conditioned for passage of signals derived from the backward output line 717. Signals appearing at the input of gate 767 set up a write forward power control flip-flop 792 which conditions a write forward power control gate 794 for passage of signals derived from a write power control 796 being delivered therethrough to an amplifier 797 which delivers its output to the forward power control terminal of the write power supply 236.

In a similar manner, signals appearing at the input of the gate 780 set up a write backward power control flip-flop 793 which conditions a write backward power control gate 795 for passage of signals from the write power control 796 through an amplifier 798 to the backward power control terminal of the write power supply 236.

The write power control flip-flops 792 and 793 are both cleared by a signal derived from a clear write instruction signalling device 799 which also delivers a clear write signal to the line 218. The clearing of the flip-flops 792 and 793 prevents the passage of power control signals from the write power control 796, and the exertion of control over the write power supply 236.

When the trinary selector flip-flop 781 receives a signal over the rewind line 756 it assumes a state which conditions neither the read nor write power gates 766, 769, 767, and 780, so that any signals appearing upon the forward or backward output lines 707, 717, do not affect the power control section of the central control device 211.

Reference is now made to both Figures 5 and 6 for a comprehensive consideration of the operation of a central control device. If a response signal is received over the lines 212, 213, when a particular selector line of the unit selector control 205 is energized, the delivery of a forward read instruction by the device 733 will result in the delivery of a signal to the read line 215, as well as to the forward line 221. The trinary selector flip-flop 781 is simultaneously set up in its read state, so that when a signal is received from the forward output line 707, the read forward power control flip-flop 782 will be set up allowing the exertion of control by the read power control 786 at the forward power control terminal of the read power supply 235. It will now be noted that the time elapsing before the flip-flop 782 is set up depends upon the response signal present upon the lines 212 and 213. This response signal is determined by the forward or backward operation for which the particular read-write unit is set up. Thus, if the read-write unit is presently set up to perform a backward operation, a clear response forward signal will be delivered over line 212 conditioning gate 702, providing the only signal channel, and setting up the flip-flop 782 through the forward loop delay 710. In this manner, the power control flip-flop 782 is not set up until the read-write unit, after receiving a signal on the forward line 221, has had a sufficient time to shift its loop balance point position from backward to forward operation. This time is also sufficient to allow for the operating time of the relays associated with the operation. When a signal from the read power control 786 is not applied to the forward power control terminal of the read power supply 235, read power is not delivered to the center drive apparatus and cannot be applied until sufficient time has elapsed for the balance point to be shifted.

If the read-write unit is presently set up for forward operation so that a response signal is present upon line 213 or upon both response lines 212 and 213, the channel open for the forward read instruction signal imposes a delay of 3.5 milliseconds before the read forward power control flip-flop 782 is set up. This allows sufficient time for the actuation of the read relays; there is no necessity in this case to shift the balance point position of the tape loops 37 and 42.

Upon the appearance of a backward read instruction from the device 737, the unit selector control energizing a particular read-write unit, and upon the appearance of a response signal on the lines 213, 212, a signal is delivered to the backward line 222 and the read line 215 as well as to the read selector line 722. This signal on line 722 insures that the trinary selector flip-flop 781 is in the read position. Under these conditions, the signal appearing at the backward output line 717 is passed through the read backward power control gate 769 to set up the read backward power control flip-flop 783 after the appropriate period of delay. The delay imposed is determined in the following manner: When a signal appears upon the response forward line 212 but not upon the clear response backward line 213, the backward read instruction is passed through the backward gate 711, indicating that the selected read-write unit is set up for backward operation. In this event the delay in the setup of backward power control flip-flop 783 is only 3.5 milliseconds, and is sufficient to allow actuation of the read relays 251 of the read-write unit. Loop shifting is unnecessary because the read-write unit is indicated to be presently set up for backward operation.

If the clear response backward line 213 is energized, or both response lines 212 and 213 are energized, the backward loop delay gate 712 will pass signals, whereas the backward gate 711 is inhibited by the clear response backward signal on line 213. Signals are thus delayed by the backward loop delay 720 for a period of 0.6 second before the backward power control flip-flop 783 is set up. This allows the read-write unit, which is indicated by the response signals to be presently set up to execute a forward operation, sufficient time to execute a loop shifting operation from the forward balance point position to the backward balance point position after delivery of a signal upon the backward line 222 setting up the backward thyratron 302.

Under conditions when a response signal derived from a particular selected read-write unit is delivered by the lines 212, 213, if a backward write instruction is delivered by the device 738, the backward line 222, the write line 217, and the write selector line 723 are energized. After the appropriate delay, the write backward power control flip-flop 793 is set up. Correspondingly, upon the initiation of a forward write instruction by the device 734, response being received by the lines 212, 213 upon the selection of a read-write unit by the unit selector control 205, the forward line 221, the write line 217, and the write selector line 723 are energized and the write forward power control flip-flop 792 is set up after the appropriate period of delay, depending upon the signal response received.

Considering the read power control flip-flops 782 and 783, only one of said flip-flops 782, 783 may be set up at a time. As a result the read power control 786 delivers signals to the power supply 235 to supply read power for either forward actuation or backward actuation of a read-write unit center drive apparatus. This is due to the fact that after a read-write unit is set up to perform a read operation, read interlock line 223 is returned to a low potential, making read instructions from the devices 733 and 737 ineffective to initiate another read operation. Before a subsequent read operation may be initiated, the clear read device 789 must deliver a signal over the line 216 clearing the read thyratrons set up so that the inhibiting read interlock signal on line 223 is removed. The delivery of the clear read signal by the device 789 also clears the power control flip-flop 782, 783 which was previously set up during the initiation of the previous read operation.

For the same reasons, write power control flip-flop 792 and 793 may not be set up concurrently because the interlock signal derived over line 224 inhibits further write instructions derived from devices 738, 734 after a write operation is initiated or if a previous write operation has not been followed by a clear write instruction derived from the device 799. The device 799 clears the write thyratrons set up in the read-write units involved, and also clears the write power control flip-flops 792, 793. A read-write unit which is engaged in another operation or is not in condition to initiate a new operation (indicated by the lack of a response over the lines 212 and 213) cannot be set up to perform a second operation. This is because when instruction signals are delivered during the period when there is no response over lines 212 and 213, no signals are delivered over the central control lines nor is the central power section set up in accordance with instruction signals.

Should a rewind instruction be delivered by the rewind device 752 and a clear response signal be present upon either or both of the lines 212 and 213, when a particular read-write unit is selected, a backward signal is delivered over the line 222. The rewind selector line 756 is energized pulsing trinary flip-flop 781 into its rewind state blocking the passage of signals through the write and read power gates 766, 769, 767, 780. The signal delivered by the backward output line 717 passes through the rewind gate 758 to energize the rewind line 219 after an appropriate period of delay, depending upon whether the read-write unit is set up to perform either a forward or backward operation. As previously explained in detail, when the read-write unit is set up to perform a backward operation, a delay of 3.5 milliseconds is imposed. On the other hand, when the selected read-write unit is presently set up to execute a forward operation, a greater delay of 0.6 second is allowed to enable the shifting of the balance point from its forward position to its backward position. This delay takes place prior to the firing of the rewind thyratron of the selected read-write unit and delivery of rewind power from the rewind power supply 237 effected upon the actuation of the rewind relays associated therewith.

The delivery of a rewind interlock instruction by the rewind interlock device 753 has the same effect as the delivery of a rewind instruction by the rewind device 752, except that the rewind interlock gate 759 is conditioned for passage of signals to the rewind line 219 as well as to the rewind interlock line 220, whereas, upon a rewind instruction, the rewind gate 758 is conditioned for passage of signals energizing the rewind line 219 exclusive of the rewind interlock line 220. Thus, when a rewind interlock instruction is effective, a rewind interlock signal appears simultaneously with the rewind signal, which signals are appropriately delayed depending upon the requirements of the situation.

It further appears that trinary selector flip-flop 781 may first be set up in one state, for instance, the read state, to initiate a read operation, and may then be set up in another state, for example, the write state, allowing a write power control flip-flop to be set up, so that a read and write operation may be performed concurrently under the supervision of the read power control 786 and the write power control 796 respectively. Trinary selector flip-flop 781 is thereafter capable of setup to its rewind state allowing the initiation of any number of rewind or rewind interlock operations without disturbing the performance of a read and a write operation.

If one of the read power control gates 784, 785, is conditioned for signal passage, the read power control 786, by delivering signals through it to the power supply 235, may determine when motor phase one and two power is to be delivered by the read power supply 235 to the read-write unit conditioned to receive read power. Tachometer phase one power, as previously explained, is always available to each of the read-write units. Thus, for example, after read forward power control gate 784 is conditioned, a signal delivered therethrough by the read power control 786 to the forward power control terminal of the read power supply 235 causes forward power, which is of the correct phase relationship to cause forward actuation of a center drive motor of the center drive apparatus in a read-write unit, and is supplied over the motor phase one and motor phase two lines. When the signal is removed from the forward power control terminal of the power supply 235, power is no longer delivered over the motor phase one and motor phase two lines. In this manner, actuation of the center drive motor of a read-write unit is controlled during a forward operation by a signal delivered from the read power control 786.

A read input device 230 shown in Figure 7, briefly referred to in connection with Figure 3, receives signals from the read-write head when forward power is delivered to the center driving apparatus which drives the tape past the head of the particular read-write unit performing this operation. Signals are likewise received by the read input device 230 over the central signal lines when a particular read-write unit is performing a read backward operation. In this case, the backward power control gate 785 is conditioned to pass therethrough signals from the read power control 786 delivered to the backward power control terminal of the read power supply 235 conditioning the supply of power to the motor phase one and motor phase two lines associated therewith. The phase relationship is such that it causes the center drive motor of the particular read-write unit involved to execute rotation in the backward direction during the performance of the backward operation.

The write power control 796 operates in a similar fashion with relation to the write power supply 236 to control forward or backward supply of power during the execution of the write operation. Thus, when a signal is delivered to the forward power control terminal of the write power supply 236, forward power is supplied on the motor phase one and motor phase two lines of the write power supply 236, whereas backward power is supplied thereby when the backward power control terminal of the write power supply 236 is stimulated. Tachometer phase one power need not be supplied by the write power supply 236, as that supplied by the read power supply 235 is utilized to energize the phase one windings of the tachometers of all of the read-write units associated with the central control device 211. The function of the tachometer signal lines returned to the read power supply 235 and write power supply 236 will be considered below when the power supply 235 is considered in detail.

The write output device 232 of Figure 7 is coordinated with the write power control 796, so that power is delivered to actuate the center drive motor of the read-write unit performing a write operation during the times when the write output device 232 is delivering signals to the read-write head via the write input lines of the central signal lines, so that proper recordation may be effected. Control may be exerted to the extent that signals will not be delivered for recordation by the write output device 232 until tape has been accelerated to a proper speed for such recordation. Said tape is decelerated only after the last signal in a group of signals being recorded has been delivered. If desired, the read input device may be controlled to prevent it from receiving signals during the period when tape is being accelerated or decelerated during a read operation and is only receptive when tape has reached operating speed so that interference and spurious signals, occurring during the time when the tape is not in condition for signal delivery to the read input device 230, will not be received by the read input device.

While this invention has been described and illustrated with reference to a specific embodiment, it is to be understood that the invention is capable of various modifications and applications, not departing essentially from the spirit thereof, which will become apparent to those skilled in the art.

What is claimed is:

1. In combination, a plurality of electric switch devices each capable of executing a first and second operation, a corresponding plurality of sets of control elements governing the operation of individual electric switch devices, common control buses connecting together corresponding members of said sets of control elements, conductors connecting an electric signalling source with said plurality of electric devices, and a signal transfer link connected between each of said individual conductors and one of said common control buses conditioned to pass signals in response to predetermined settings of said control elements.

2. Magnetic recording and play-back apparatus comprising an electromagnetic transducer for reading information from a magnetic recording medium and for writing information onto a magnetic recording medium; first, second, third and fourth switch means each having a first and a second operative condition; input terminal means for connecting said transducer to a source of signals to be recorded; and means for so interconnecting said switch means and said transducer that said transducer is connected to said input terminal means when said first and second switch means are in their second operative condition and said third and fourth switch means are in their first operative condition.

3. Magnetic recording and play-back apparatus comprising an electromagnetic transducer for reading information from a magnetic recording medium and for writing information onto a magnetic recording medium; first, second, third and fourth switch means; each said switch means having a first operative condition and a second operative condition; terminal means for connecting an output circuit responsive to information read by said transducer to said transducer; and means for so interconnecting said switch means and said transducer that with said first and second switch means in their first operative condition and said third and fourth switch means in their second operative condition said transducer is connected to said terminal means.

4. Magngetic recording and play-back apparatus comprising an electromagnetic transducer for reading information from a magnetic recording medium and for writing information onto a magnetic recording medium; first, second, third and fourth switch means; each said switch means having a first operative condition and a second operative condition; individual means for selectively placing each of said switch means in said first and in said second operative conditions; first terminal means for connecting a source of information signals to be written to said transducer; second terminal means for connecting an output circuit responsive to information read by said transducer to said transducer; and means for so interconnecting said switch means, said transducer and said terminal means that with said first and second switch means in said second operative condition and said third and fourth switch means in said first operative condition said transducer is connected to said first terminal means, and with said first and second switch means in said first operative condition and said third and fourth switch means in said second operative condition said transducer is connected to said second terminal means.

5. Apparatus for selectively connecting an electromagnetic transducer in a magnetic recording and playback system to an input device for writing or to an output device for reading; said apparatus comprising first, second, third and fourth double-throw switch devices; each of said switch devices having a first and a second operative condition; each of said switch devices having a first contact, a second contact and a moveable arm; said switches being in the first operative condition when their moveable arms abut the respective first contacts and being in the second operative condition when their moveable arms abut the respective second contacts; a first input terminal; a second input terminal; an output terminal; an electromagnetic transducer having a first end and a second end; the first end of said transducer being connected to the moveable arm of said second switch device; the first contact of said second switch device adapted to be connected to a reference potential; the second contact of said second switch device being connected to said second input terminal; the second end of said transducer being connected to the moveable arm of said third switch device; the first contact of said third switch device being connected to the moveable arm of said first switch device; the second contact of said third switch device being connected to the moveable arm of said fourth switch device; first contact of said first switch device adapted to be connected to ground; the second contact of said first switch device being connected to said first input terminal; the first contact of said fourth switch device adapted to be connected to ground; the second contact of said fourth switch device being connected to said output terminal; and individual control means for selectively placing each of said switch devices in its first or its second operative condition whereby with said first and second switch devices in said second operative condition and said third and fourth switch devices in said first operative condition said transducer is connected to said first and second input terminals and in condition to write, with said first and second switch devices in said first operative condition and said third and fourth switch devices in said second operative condition said transducer is connected to said reference potential and said output terminal and in condition to read, and with all of said switch devices in said first operative condition said transducer is connected to ground and said reference potential and in condition to neither read nor write.

References Cited in the file of this patent

UNITED STATES PATENTS 2,131,322 Higgitt ---------------- Sept. 27, 1938